United States Patent
Hutchins et al.

(10) Patent No.: US 10,321,339 B2
(45) Date of Patent: Jun. 11, 2019

(54) COMMUNICATION SYSTEM AND METHOD FOR CORRELATING WIRELESS COMMUNICATION PERFORMANCE WITH VEHICLE SYSTEM CONFIGURATIONS

(71) Applicant: General Electric Company, Schenectady, NY (US)

(72) Inventors: Maurice Hutchins, Mims, FL (US); Brian William Schroeck, Rockledge, FL (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 840 days.

(21) Appl. No.: 14/521,505

(22) Filed: Oct. 23, 2014

(65) Prior Publication Data

US 2016/0119799 A1    Apr. 28, 2016

(51) Int. Cl.
*H04W 24/04* (2009.01)
*H04W 64/00* (2009.01)
(Continued)

(52) U.S. Cl.
CPC ......... *H04W 24/04* (2013.01); *B61L 15/0027* (2013.01); *B61L 15/0081* (2013.01);
(Continued)

(58) Field of Classification Search
CPC combination set(s) only.
See application file for complete search history.

(56) References Cited

U.S. PATENT DOCUMENTS

2007/0219682 A1* 9/2007 Kumar ................ B61L 27/0027
701/19
2010/0118988 A1* 5/2010 Smith, Jr. ........... B61L 27/0038
375/259
(Continued)

OTHER PUBLICATIONS

European Search Report and Opinion issued in connection with corresponding EP Application No. 15190985.0 dated Apr. 6, 2016.
(Continued)

*Primary Examiner* — Zhitong Chen
(74) *Attorney, Agent, or Firm* — Christopher R. Carroll; The Small Patent Law Group LLC

(57) ABSTRACT

Systems and methods for correlating wireless communication performance with vehicle system configurations determine wireless message characteristics of wireless messages communicated with vehicles in vehicle systems and locations along a route where the wireless message characteristics were determined. The wireless message characteristics and the locations can be determined during movement of the vehicle systems along a route. Consist configuration information about the one or more vehicle systems is obtained, and a signal propagation profile is determined based on the wireless message characteristics, the locations where the wireless message characteristics were determined, and the consist configuration information. The signal propagation profile can represent one or more relationships between the wireless message characteristics, the consist configuration information, and the locations along the route. This profile can be used to control movement and/or communication of other vehicle systems, to generate trip plans for other vehicle systems, to diagnose communication faults, and the like.

23 Claims, 5 Drawing Sheets

(51) Int. Cl.
*B61L 15/00* (2006.01)
*B61L 27/00* (2006.01)
*H04W 84/00* (2009.01)

(52) U.S. Cl.
CPC ....... *B61L 27/0027* (2013.01); *H04W 64/006* (2013.01); *H04W 84/005* (2013.01)

(56) References Cited

U.S. PATENT DOCUMENTS

| | | | |
|---|---|---|---|
| 2010/0204856 A1* | 8/2010 | Smith | B61C 17/12 701/19 |
| 2011/0009056 A1* | 1/2011 | Hanson | H04B 7/15535 455/9 |
| 2014/0231595 A1* | 8/2014 | Fanara | B61C 17/12 246/167 R |

OTHER PUBLICATIONS

First Office Action for corresponding European Application No. 15190985.0 dated Jan. 4, 2019 (4 pages).

* cited by examiner

COMMUNICATION SYSTEM AND METHOD FOR CORRELATING WIRELESS COMMUNICATION PERFORMANCE WITH VEHICLE SYSTEM CONFIGURATIONS

FIELD

Embodiments of the inventive subject matter described herein relate to communications between vehicles in vehicle systems.

BACKGROUND

Some known vehicle consists include several powered vehicles that generate tractive effort for propelling the vehicle consists along a route. For example, trains may have several locomotives coupled with each other that propel the train along a track. The locomotives may communicate with each other in order to coordinate the tractive efforts and/or braking efforts provided by the locomotives. As one example, locomotives may be provided in a distributed power (DP) arrangement with one locomotive designated as a lead locomotive and other locomotives designated as remote locomotives. The lead locomotive may direct the tractive and braking efforts provided by the remote locomotives during a trip of the consist.

Some known consists use wireless communication between the locomotives for coordinating the tractive and/or braking efforts. For example, a lead locomotive can issue commands to the remote locomotives. The remote locomotives receive the commands and implement the tractive efforts and/or braking efforts directed by the commands. In order to ensure that the remote locomotives receive the commands, the lead locomotive may periodically re-communicate the commands until all of the remote locomotives confirm receipt of the commands by communicating a confirmation message to the lead locomotive.

Due to various factors, wireless communication between the locomotives may not be possible or may be hindered in certain locations along a route. While some communication issues may be logged during trips of trains along some routes, this information is not known to be used proactively for upcoming trips of other trains.

BRIEF DESCRIPTION

In one embodiment, a method (e.g., for correlating wireless communication performance with vehicle system configurations) includes determining wireless message characteristics of wireless messages communicated with first vehicles in one or more first vehicle systems and locations along a route where the wireless message characteristics were determined. The wireless message characteristics and the locations can be determined during movement of the one or more first vehicle systems along a route. The method also can include obtaining consist configuration information about the one or more first vehicle systems, and determining a signal propagation profile based on the wireless message characteristics, the locations where the wireless message characteristics were determined, and the consist configuration information. The signal propagation profile can represent one or more relationships between the wireless message characteristics, the consist configuration information, and the locations along the route.

In another embodiment, a system (e.g., an analysis system) can includes one or more processors configured to determine wireless message characteristics of wireless messages communicated with first vehicles in one or more first vehicle systems and locations along a route where the wireless message characteristics were determined. The wireless message characteristics and the locations can be determined during movement of the one or more first vehicle systems along a route. The one or more processors also can be configured to obtain consist configuration information about the one or more first vehicle systems, and to determine a signal propagation profile based on the wireless message characteristics, the locations where the wireless message characteristics were determined, and the consist configuration information. The signal propagation profile can represent one or more relationships between the wireless message characteristics, the consist configuration information, and the locations along the route. The one or more processors can include a single processor that performs all of these operations, two or more processors that each perform all of these operations, two or more processors that perform different ones of the above operations, and/or two or more processors that each perform part of one or more of the above operations.

In another embodiment, a system (e.g., a communication system of a vehicle system) includes a control unit configured to be disposed onboard a first vehicle system having plural vehicles for traveling together along a route. The control unit can be configured to obtain a signal propagation profile for the route that is representative of wireless message characteristics for one or more second vehicle systems, consist configuration information of the one or more second vehicle systems, and locations along the route where the wireless message characteristics were measured during previous travel of the one or more second vehicle systems along the route. The control unit can be configured to compare consist configuration information of the first vehicle system with the consist configuration information of the one or more second vehicle systems in the signal propagation profile to determine a spatial relationship between the wireless message characteristics of the one or more second vehicle systems and the locations along the route.

BRIEF DESCRIPTION OF THE DRAWINGS

Reference is now made briefly to the accompanying drawings, in which.

DETAILED DESCRIPTION

Figure 1:
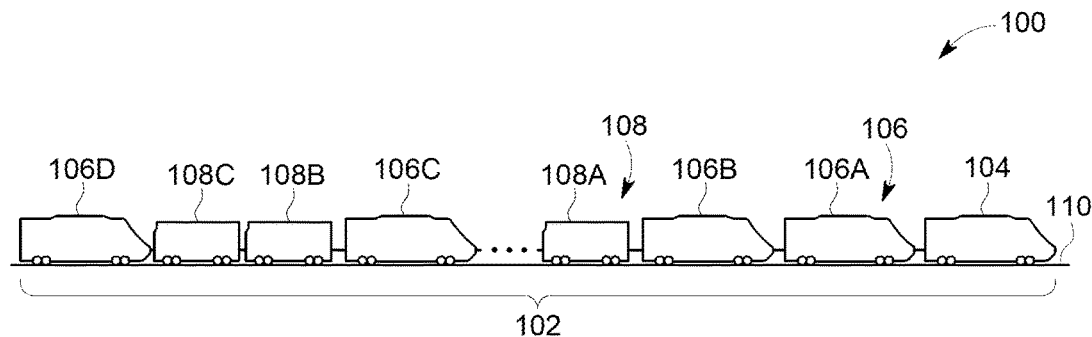
FIG. 1 is a schematic view of one embodiment of a communication system of a vehicle consist or vehicle system.

One or more embodiments of the inventive subject matter described herein provide methods and systems for correlating wireless communication performance of vehicle systems with configurations of the vehicle systems along one or more routes. During travel of vehicle systems along routes, data related to wireless (e.g., radio-frequency) reception of messages communicated to and/or between vehicles in the vehicle systems is obtained. This data can include characteristics of the signals. The characteristics can include strengths of the received messages (e.g., receive signal strength), messages that were expected to be received but were not received (e.g., missing messages), messages that were expected and that were received as expected (e.g., successfully communicated messages), messages that are received but having incomplete or otherwise corrupted data (e.g., corrupted messages), or the like.

For example, the signal strengths of distributed power (DP) messages or other messages communicated between propulsion-generating vehicles of a vehicle system can be measured at different locations along a route. Additionally or alternatively, the failure to receive messages communicated at known times (e.g., based on a log or other record of when the messages are transmitted or broadcast) can be determined, the receipt of messages communicated at known times, and/or messages that were received but have missing or otherwise corrupt data in the messages can be measured or otherwise recorded at different locations along a route. This data (e.g., wireless message characteristics) can be collected for several different vehicle systems traveling over the same route at different times. The wireless message characteristics and locations at which the vehicles were located when the messages were received or should have been received can be communicated to an off-board location, such as an analysis system disposed off-board the vehicle systems. Additional information, such as consist configuration information of the vehicle systems, also may be obtained. This information can represent the sizes of the vehicle systems (e.g., lengths of the vehicle systems, the number of vehicles in the vehicle systems, etc.), the relative positions of certain vehicles in the vehicle systems (e.g., how far propulsion-generating vehicles are from each other in the vehicle systems), or other information about how the vehicle systems are configured. Alternatively, the analysis system may be disposed onboard one or more vehicle systems.

The wireless message characteristics, the locations at which the wireless message characteristics were measured or otherwise determined, and the consist configuration information can be examined to determine one or more signal propagation profiles for a route. The signal propagation profiles can represent relationships between the wireless message characteristics, the locations along the route, and the consist configuration information. For example, for a first consist configuration information (e.g., a first length of a vehicle system, a first distance between two vehicles in the vehicle system, a first distribution of the vehicles in the vehicle system, etc.), a first relationship of the signal propagation profile can represent the wireless message characteristics that were determined or measured at the corresponding locations along the route when one or more vehicle systems formed according to the first consist configuration information traveled along the route. For different, second consist configuration information (e.g., a longer second length of a vehicle system, a longer second distance between two vehicles in the vehicle system, a different, second distribution of the vehicles in the vehicle system, etc.), a different, second relationship of the signal propagation profile can represent the wireless message characteristics that were measured or determined at the corresponding locations along the route when one or more vehicle systems formed according to the second consist configuration information traveled along the route. Several different relationships can be formed for different consist configurations for a route. Optionally, a signal propagation profile can represent the wireless message characteristics that were measured at different locations along the route for different pairs of vehicles that were communicating or attempting to communicate with each other.

The signal propagation profile for a route can be used in a variety of manners. For example, the signal propagation profile can be provided to a vehicle system that is to travel on a route so that the vehicle system can provide warnings to an onboard operator when the vehicle system is approaching a segment of the route that is known to have poor communications based on the consist configuration information of the vehicle system and the signal propagation profile.

As another example, an energy management system can refer to a signal propagation profile for a route to determine which segments of the route are likely to have poor communications. The energy management system can create a trip plan for an upcoming trip of the vehicle system over the route based at least in part on the signal propagation profile. This trip plan can dictate operational settings of the vehicle system (e.g., throttle settings, brake settings, speeds, etc.) as a function of time and/or distance along the route. The trip plan can be created so that the operational settings for one or more of the vehicles do not change during travel of the vehicle system through the segments of the route that are likely to have poor communications (e.g., based on the signal propagation profile and the consist configuration information of the vehicle system). As a result, the inability for a lead vehicle to communicate command signals to one or more remote vehicles in these segments of the route may not prevent the vehicle system from being able to travel according to the trip plan.

Optionally, instead of or in addition to not changing the operational settings during travel through segments likely to have poor communications, the trip plan could be created and the lead vehicle can look ahead to determine upcoming locations likely to have poor communications. The lead vehicle can communicate scheduled commands to the remote vehicles before reaching or arriving at these locations. The scheduled commands can notify the remote vehicles of the operational settings designated by the trip plan, as well as the designated times and/or locations where these operational settings are to be implemented by the remote vehicles. The remote vehicles can receive the scheduled commands before the designated times and/or before reaching the designated locations. Responsive to reaching the designated times and/or designated locations, the remote vehicles can implement the designated operational settings in the scheduled commands such that, even if communications are interrupted between the remote vehicles and the lead vehicles, the remote vehicles can still operate according to the trip plan.

As another example, prior to forming the vehicle system, the signal propagation profile may be examined for a route to determine if one or more different configurations of the vehicle system are likely to result in better communications during travel over the route than one or more other configurations.

As another example, during travel over the route, wireless message characteristics may be monitored and compared to the signal propagation profile. Based on the signal propagation profile and the consist configuration information of the vehicle system that is monitoring the wireless message characteristics, the vehicle system may be able to determine if a fault has occurred with a communication system of the vehicle system. For example, based on the consist configuration information of the vehicle system, the signal propagation profile for the route may indicate an expected wireless message characteristic at one or more locations along the route. If the actual wireless message characteristic of the vehicle system falls below the expected wireless message characteristic, then the actual wireless message characteristic may indicate a fault with a communication system.

FIG. 1 is a schematic view of one embodiment of a communication system 100 of a vehicle consist or vehicle system 102. The illustrated vehicle system 102 includes propulsion-generating vehicles 104, 106 (e.g., vehicles 104, 106A, 106B, 106C, 106D) and non-propulsion-generating vehicles 108 (e.g., vehicles 108A, 108B, 108C) mechanically coupled with each other. The communication system 100 can include components (described below) disposed onboard two or more of the vehicles 104, 106. The propulsion-generating vehicles 104, 106 are capable of self-propulsion while the non-propulsion-generating vehicles 108 are not capable of self-propulsion. The propulsion-generating vehicles 104, 106 are shown as locomotives, the non-propulsion-generating vehicles 108 are shown as rail cars, and the vehicle consist 102 is shown as a train in the illustrated embodiment. Alternatively, the vehicles 104, 106 may represent other vehicles, such as automobiles, marine vessels, or the like, and the vehicle consist 102 can represent a grouping or coupling of these other vehicles. In one embodiment, the vehicles 104, 106 may not be mechanically coupled with each other. For example, the vehicles 104, 106 may be separate from each other, but may communicate with each other to coordinate operations of the vehicles 104, 106. For example, the vehicle 104 may wirelessly communicate operational command signals to the vehicles 106 that remotely control or direct operational settings of the vehicles 106 so that the vehicles 104, 106 can remain designated distances from each other or otherwise travel together. The number and arrangement of the vehicles 104, 106 in the vehicle consist 102 are provided as one example and are not intended as limitations on all embodiments of the subject matter described herein.

The vehicles 104, 106 can be arranged in a distributed power (DP) arrangement. For example, the vehicles 104, 106 can include a lead vehicle 104 that issues command messages to the other vehicles 106A, 106B, 106C, 106D, which are referred to herein as remote vehicles. The designations "lead" and "remote" are not intended to denote spatial locations of the vehicles 104, 106 in the vehicle consist 102, but instead are used to indicate which vehicle 104, 106 is communicating (e.g., transmitting, broadcasting, or a combination of transmitting and broadcasting) operational command messages and which vehicles 104, 106 are being remotely controlled using the operational command messages. For example, the lead vehicle 104 may or may not be disposed at the front end of the vehicle consist 102 (e.g., along a direction of travel of the vehicle consist 102). Additionally, the remote vehicles 106A-D need not be separated from the lead vehicle 104. For example, a remote vehicle 106A-D may be directly coupled with the lead vehicle 104 or may be separated from the lead vehicle 104 by one or more other remote vehicles 106A-D and/or vehicles 108.

The operational command messages may include directives that direct operations of the remote vehicles. These directives can include propulsion commands that direct propulsion subsystems of the remote vehicles to move at a designated speed and/or power level, brake commands that direct the remote vehicles to apply brakes at a designated level, and/or other commands. The lead vehicle 104 issues the command messages to coordinate the tractive efforts and/or braking efforts provided by the vehicles 104, 106 in order to propel the vehicle consist 102 along a route 110, such as a track, road, waterway, or the like. The operational command messages can be communicated using the communication system 100, as described below. In one embodiment, the operational command messages are wirelessly communicated between the vehicles 104, 106 using the communication system 100. Optionally, one or more command signals may be communicated from an off-board source to one or more of the vehicles 104, 106, such as from a tower, dispatch center, off-board remote control, or the like.

Figure 2:
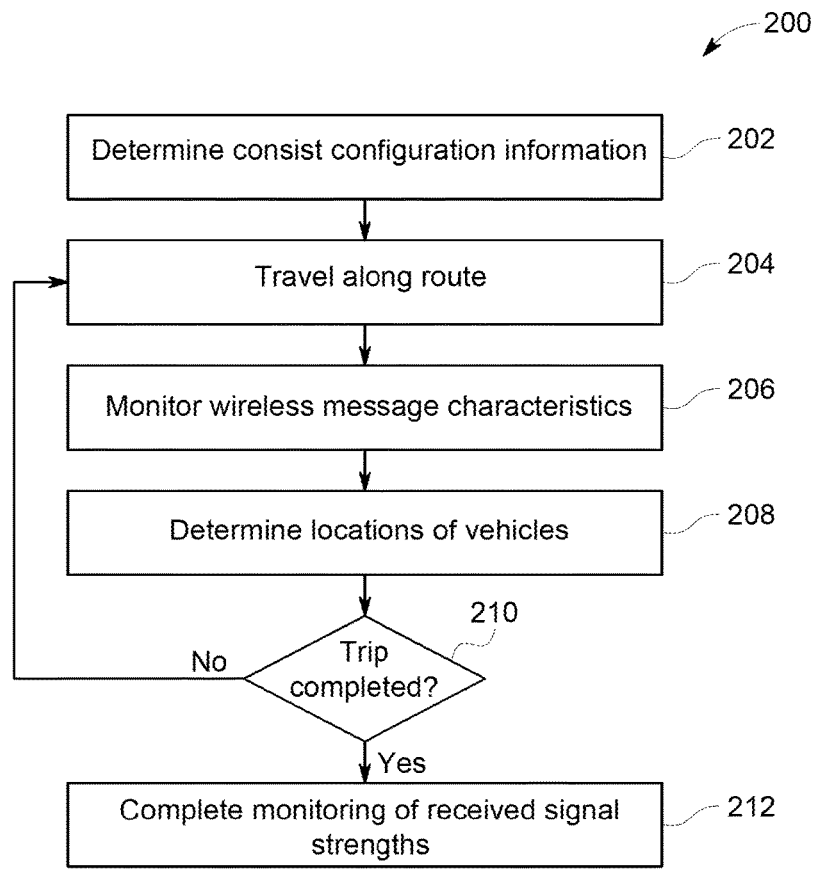
FIG. 2 illustrates a flowchart of one embodiment of a method for correlating wireless communication performance with vehicle system configurations.

FIG. 2 illustrates a flowchart of one embodiment of a method 200 for correlating wireless communication performance with vehicle system configurations. The operations described in connection with the method 200 may be performed in an order that differs from that shown in FIG. 2. At 202, consist configuration information of the vehicle system 102 is determined. This information can include the size of the vehicle system 102, such as the total length of the vehicle system 102, the number of vehicles 104, 106, 108 (shown in FIG. 1) in the vehicle system 102, distributions or relative positions of the vehicles 104, 106 in the vehicle system 102, separation distances between different pairs of the vehicles 104, 106, or the like. With respect to the distributions or relative positions of the vehicles 104, 106, this information can represent how close or far the different vehicles 104, 106 are from each other in the vehicle system 102. The consist configuration information may be input into a control unit of one or more of the vehicles 104, 106 (described below), saved in a memory of one or more of the vehicles 104, 106 (described below), or otherwise logged or recorded. At 204, the vehicle system 102 travels along the route 110.

The vehicle system 102 can travel along the route 110 and, during this movement over the route 110, the vehicles 104, 106 can wirelessly communicate with each other. For example, the lead vehicle 104 may periodically, occasionally, or otherwise, transmit or broadcast operational command signals to one or more of the remote vehicles 106. These signals can direct the remote vehicles 106 to change or use various operational settings, such as throttle notch positions, brake settings, or the like. The signals can be communicated to the vehicles 106 when the vehicles 106 are at different locations along the route 110.

At 206, wireless message characteristics of the messages communicated between the vehicles 104, 106 are monitored. These wireless message characteristics can include received signal strengths. For example, the strength of the wireless message that are received at one or more of the vehicles 104, 106 can be measured. In one aspect, the received signal strengths represent magnitudes of electric fields at or near antennas used by the vehicles 104, 106 to receive the signals. The received signal strengths may be expressed in terms of voltage per unit length of the electric field, decibels, decibel millivolts per meter, decibel microvolts per meter, or in another manner. The received signal strengths can be measured by communication units of the vehicles 104, 106 (described below) that receive the signals.

In one embodiment, the received signal strengths are measured at the lead vehicle 104. For example, the lead vehicle 104 may communicate operational command signals or messages to the remote vehicles 106 at different times and/or locations during movement along the route 110. In response to broadcasting or transmitting a signal to one or more of the remote vehicles 106, a communication unit of the lead vehicle 104 may monitor for signals communicated from the remote vehicles 106. The remote vehicles 106 may send signals in response to the signals from the lead vehicle 104, such as reply signals that confirm receipt of the command signals from the lead vehicle 104 and/or provide statuses of the remote vehicles 106 to the lead vehicle 104. The communication unit and/or a control unit (described below) of the lead vehicle 104 may record the location of the lead vehicle 104 and the different signal strength of reply signals from the different remote vehicles 106.

If no signal is received from one or more of the remote vehicles 106, then the communication unit of the lead vehicle 104 may record a received signal strength of zero, or "no signal received," or another indication representative of the lead vehicle 104 not receiving a response from a remote vehicle 106. This failure to receive a message when the responsive message is expected can be another wireless message characteristic, referred to as a missed message. The lead vehicle 104 may expect to receive a message in response to a previous message (e.g., a response message sent in response to a command message) and, if no message is received within a designated time period (e.g., 50 milliseconds, 100 milliseconds, one second, or another length of time) and/or from the vehicle 106 to which the command message was sent, then the lead vehicle 104 can determine that the location of the lead vehicle 104 and/or the remote vehicle 106 resulted in a missed message.

Another example of a wireless message characteristic includes the receipt of a corrupted message. A corrupted message can include a message that is only partially received, that includes data that cannot be understood or interpreted by the vehicle, data that is incorrect (e.g., the data in the message that is received by one vehicle differs in content and/or size from the data in the message that was sent by another vehicle), or that is otherwise unusable to control operations of the vehicles. Another wireless message characteristic can include the successful receipt of a message, such as the receipt of a message with the data in the message intact and received as expected (e.g., in response to a command message).

Additionally or alternatively, the remote vehicles 106 (e.g., control units and/or communication units of the remote vehicles 106) can monitor for signals sent by the lead vehicle 104 and, when a signal is received by a remote vehicle 106, the remote vehicle 106 can record (e.g., log) the strength of the received signal and the location of the remote vehicle 106. The remote vehicles 106 optionally can record the failure to receive a message (e.g., a missed message), receipt of a corrupted message, and/or successful receipt of a message, along with the locations of the remote vehicles 106.

At 208, locations of the vehicles 104, 106 are determined. For example, location determining units of the vehicle system 102 and/or the vehicles 104, 106 (described below) can identify locations of the vehicles 104, 106 as the vehicle system 102 moves along the route 110. The wireless message characteristics and/or locations of the vehicles 104, 106 can be recorded or otherwise saved, such as on one or more memories of the vehicle system 102.

In one embodiment, a control unit and/or location determining unit (described below) of the lead vehicle 104 can determine where the lead vehicle 104 is located at a time that a command signal is sent from the lead vehicle 104 to one or more of the remote vehicles 106. This may be recorded by the control unit and/or location determining unit as the location of the lead vehicle 104 that is associated with the wireless message characteristics for one or more reply signals sent from the remote vehicles 106 to the lead vehicle 104 in response to the command signal. Alternatively, the location associated with the wireless message characteristics may be determined as the location of the lead vehicle 104 after a designated time delay following transmission or broadcast of the command signal from the lead vehicle 104. This time delay may be different for different remote vehicles 106. For example, the time delay associated with a first remote vehicle 106 that is closer to the lead vehicle 104 than a second remote vehicle 106 may be less than the time delay associated with the second remote vehicle 106. The control unit and/or location determining unit of the lead vehicle 106 may determine the location of the lead vehicle 104 after this time delay expires following communication of a command signal to one or more of the remote vehicles 106. If different time delays are used for different remote vehicles 106, then several different locations may be recorded for the lead vehicle 104 for the wireless message characteristics associated with the reply messages or reply signals sent by the remote vehicles 106 to the lead vehicle 106 in response a command message or command signal from the lead vehicle 106. Optionally, the control units and/or location determining units onboard the remote vehicles 106 can record locations of the remote vehicles 106 at times when the wireless message characteristics are measured or determined, and/or when the signals are received (for which the wireless message characteristics are measured or otherwise determined).

At 210, a determination is made as to whether the trip of the vehicle system 102 along the route 110 is complete. For example, a determination may be made as to whether the vehicle system 102 is no longer moving along the route 110, whether the vehicle system 102 is no longer manned by one or more operators, whether a designated time period has expired (even if the vehicle system 102 continues to move along the route 110), or the like. If the trip is not complete, then flow of the method 200 can return to 204 so that the vehicle system 102 continues to travel along the route 110 while wireless message characteristics and locations of the vehicles 104, 106 are monitored. If the trip is complete, then flow of the method 200 can proceed to 212. At 212, the monitoring of the wireless message characteristics and/or locations of the vehicles 104, 106 can be completed.

The wireless message characteristics, locations 300 of the vehicles 104, 106, and the consist configuration information can be used to generate a signal propagation profile for the route 110. The wireless message characteristics, vehicle locations 300, and the consist configuration information can be obtained from several different trips of the same or different vehicle systems 102 over the same route 110. The wireless message characteristics, vehicle locations 300, and the consist configuration information can be provided to an analysis system (described below) to determine the signal propagation profile for the route 110.

The wireless message characteristics that previously were measured for one or more vehicle systems 102 traveling over the route 110 can be obtained from the vehicle systems 102 for examination by an analysis system (described below). Additionally, the locations at which these wireless message characteristics were measured can be obtained, as well as the consist configuration information of the vehicle systems 102. Several different vehicle systems 102 having different or the same consist configuration information can communicate the wireless message characteristics and locations to a memory of the analysis system described below. This data can be collected and/or updated over an extended period of time, such as several days, weeks, months, years, or the like.

As described above, the lead and/or remote vehicles 104, 106 can log or otherwise record the wireless message characteristics and associated locations of the vehicles 104, 106 during trips of the vehicle systems 102 along the route 110. This information can be communicated to the analysis system, such as after the trips are completed, during travel along the route 110, or at another time. In one aspect, other data may be communicated to the analysis system, such as time-varying conditions (e.g., environmental conditions that change with respect to time, such as weather conditions, precipitation, wind, or the like).

The wireless message characteristics, associated locations, and the consist configuration information can be examined to correlate the wireless message characteristics and locations with different consist configuration information. In one aspect, other data may be correlated with the message characteristics and/or locations, such as weather conditions. The wireless message characteristics that are determined for vehicle systems 102 having the same or similar consist configuration information may be used to form different parts of a signal propagation profile for the route 110. For example, the wireless message characteristics that are determined for a first group of the vehicle systems 102 traveling over the same route 110 and having the same or similar consist configuration information can be used to determine at least part of a signal propagation profile for the route 110. Additionally, the wireless message characteristics that are determined for a different, second group of vehicle systems 102 traveling over the same route 110 but having different consist configuration information than the first group may be used to form another part of the signal propagation profile for the route 110. In one aspect, different signal propagation profiles can be determined for different time-varying conditions, such as different weather conditions. For example, a first signal propagation profile may represent the wireless message characteristics and vehicle locations for a group of vehicles having first consist configuration information and during first weather conditions (e.g., clear skies). A different, second signal propagation profile may represent the wireless message characteristics and vehicle locations for the same or different group of vehicles having the same or different consist configuration information and during different, second weather conditions (e.g., rain).

In one aspect, the signal propagation profile for the route 110 includes one or more signal propagation maps of the route 110. These maps can represent locations and associated wireless message characteristics at those locations for vehicle systems 102 having various consist configurations.

Figure 3:
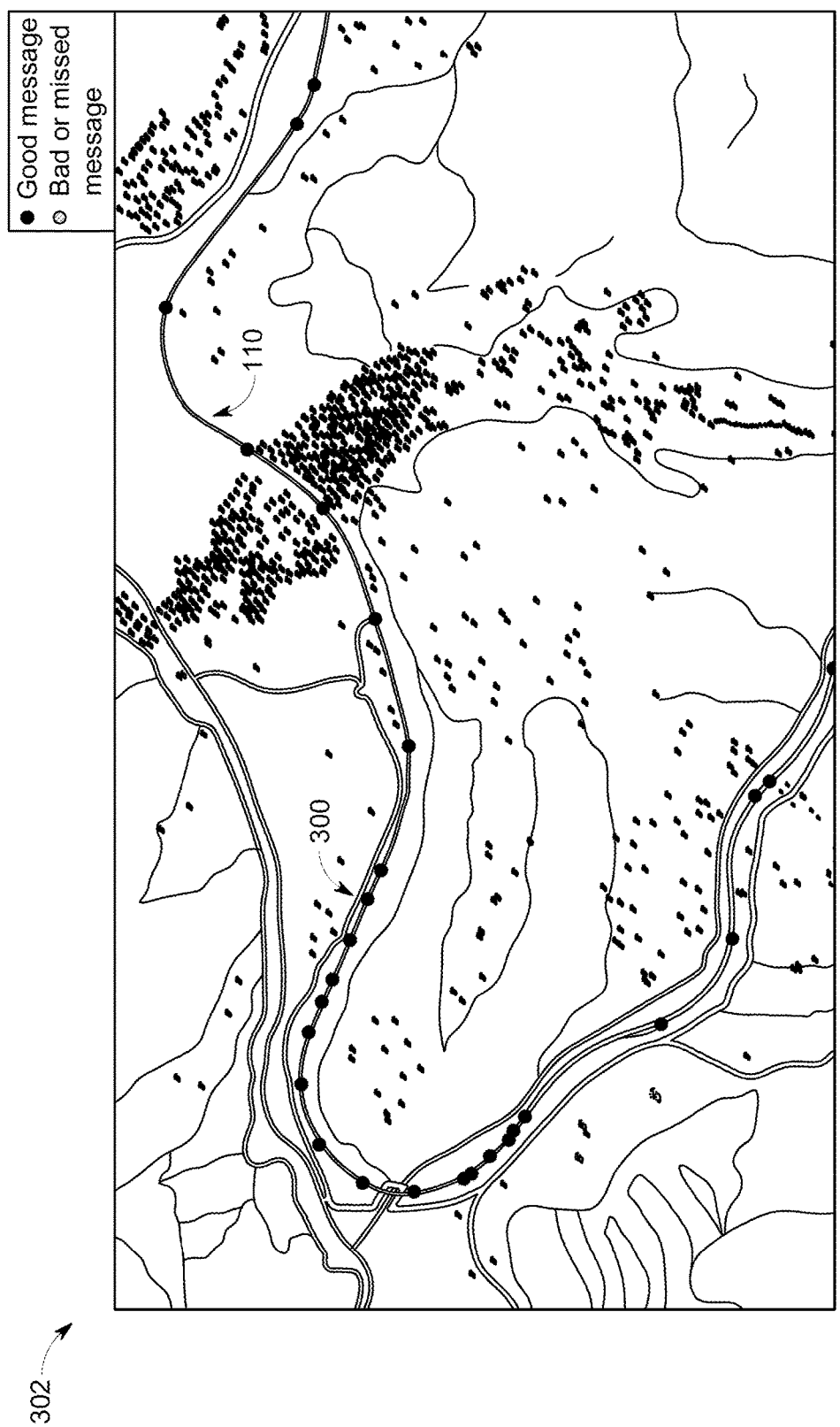
FIG. 3 illustrates one example of a signal propagation map of a route shown in FIG. 1.

FIG. 3 illustrates one example of a signal propagation map 302 of the route 110 shown in FIG. 1. The signal propagation map 302 represents a portion of a signal propagation profile of the route 110 that shows several locations 300 where wireless message characteristics were determined. The locations 300 can represent the wireless message characteristics determined during previous trips of one or more vehicle systems 102 having the same or similar consist configuration information over the same route 110. The locations 300 may be shown on an output device (described below) onboard one or more of the vehicles 104, 106 as icons or other objects that represent the wireless message characteristics. Optionally, the map 302 may include the locations 300 and the signal strengths recorded or represented in another manner, such as a list, table, spreadsheet, graphical curve, or the like, that associates different locations 300 with the signal strengths measured by one or more vehicle systems 102 at those locations. In one embodiment, if multiple vehicle systems 102 measure different wireless message characteristics at or near the same location 300 (e.g., at locations that are within ten meters, twenty meters, or the like, of each other), then these signal strengths may be combined by calculating an average, median, or the like.

Figure 4:
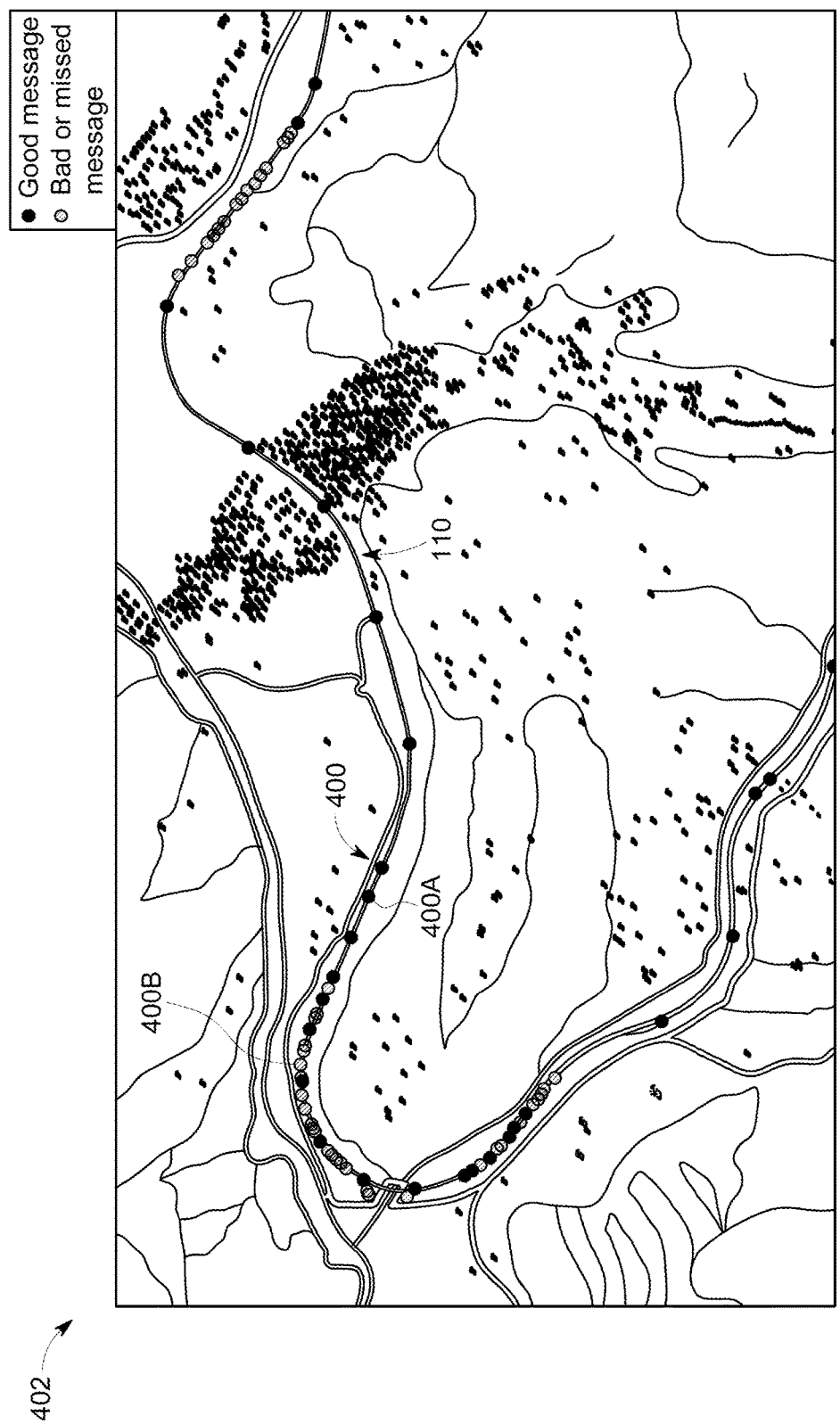
FIG. 4 illustrates another example of a signal propagation map of the route shown in FIG. 1.

FIG. 4 illustrates another example of a signal propagation map 402 of the route 110 shown in FIG. 1. The signal propagation map 402 represents another portion of the signal propagation profile of the route 110 that includes the signal propagation map 302 shown in FIG. 3. The map 402 also includes several locations 400 (e.g., locations 400A, 400B) where wireless message characteristics were measured.

The maps 302, 402 may differ from each other in that the map 302 may be generated based on the wireless message characteristics measured for one or more vehicle systems 102 having the same or similar first consist configuration information while the map 402 is based on the wireless message characteristics measured for one or more other vehicle systems 102 having the same or similar second consist configuration information that is different from the first consist configuration information. The consist configuration information for two or more vehicle systems 102 may be similar when the consist configuration information for the vehicle systems 102 is within a designated range of each other. For example, if the lengths of the vehicle systems 102, the number of vehicles 104, 106, 108 in the vehicle systems 102, or the like, are within 5%, 10%, 20%, or the like, of each other, then the wireless message characteristics measured for these vehicle systems 102 may be included together to form a common part of the signal propagation profile, such as being used to create the map 302 or 402. In the illustrated example, the map 302 may be created using the wireless message characteristics measured for one or more vehicle systems 102 having ninety vehicles 104, 106, 108 while the map 402 is created using the wireless message characteristics measured for one or more vehicle systems 102 having one hundred and thirty vehicles 104, 106, 108.

The signal propagation profile for the route 110 can represent the wireless message characteristics at different locations 300, 400 along the route 110 for the vehicle systems 102 having different consist configuration information. In the illustrated example, the wireless message characteristics at the locations 300 in the map 302 of the signal propagation profile are sufficiently strong (e.g., the wireless message characteristics exceed a designated threshold, such as at least −30 dBm, at least −40 dBm, or the like) to indicate that the signals were received by the vehicles 104 and/or 106 at the associated locations 300. Similarly, the wireless message characteristics at the locations 400A in the map 402 of the signal propagation profile are sufficiently strong to indicate that the signals were received. In contrast, the wireless message characteristics at the locations 400B in the map 402 may not be sufficiently strong (e.g., the wireless message characteristics do not exceed the designated threshold) to indicate that the signals were received by the vehicles 104 and/or 106 at the associated locations 400B. Additional maps, lists, databases, or other memory structures representative of the wireless message characteristics measured or determined at different locations along the route 110 for vehicle systems 102 having different consist configuration information can be determined and used to form the signal propagation profile for the route 110.

The signal propagation profiles for the route 110 represent spatial relationships between the wireless message characteristics measured or determined during one or more previous trips of one or more vehicle systems along the same route 110. The spatial relationships may be represented as maps, tables, lists, or the like, that correlate or otherwise match the previously measured or determined wireless message characteristics with the locations at or near where the vehicles 104, 106 were located when the characteristics were measured or determined. The signal propagation profiles also can depend or change based on the consist configuration information of the vehicle systems. As a result, the signal propagation profile for the route 110 represents one or more relationships between the wireless message characteristics, the locations at which the vehicles 104 and/or 106 were located when the wireless message characteristics were measured or determined, and the consist configuration information. The signal propagation profiles can be used to assist in the upcoming travel of one or more other vehicle systems 102 along the route 110, to plan for upcoming trips of these vehicle systems 102 along the route 110, or the like.

For example, in addition or in place of the maps 300, 400, information such as in the table below may be the signal propagation profiles for two different consist configurations (e.g., "Consist Configuration A" and "Consist Configuration B"):

| Consist Configuration A | | | | Consist Configuration B | | | |
|---|---|---|---|---|---|---|---|
| Location | RSS | Rx | Q | Location | RSS | Rx | Q |
| 1 | −60 | 1 | 1 | 2 | −70 | 1 | 1 |
| 3 | −65 | 1 | 1 | 3 | −77 | 1 | 1 |
| 4 | −80 | 1 | 1 | 4 | −90 | 1 | 0 |
| 6 | −70 | 1 | 1 | 5 | −105 | 1 | 1 |
| 8 | 0 | 0 | 0 | 8 | 0 | 0 | 0 |
| 13 | −115 | 1 | 1 | 9 | 0 | 0 | 0 |
| 14 | −90 | 1 | 1 | 13 | −110 | 1 | 1 |
| 16 | −60 | 1 | 1 | 15 | −70 | 1 | 1 |
| 22 | −60 | 1 | 1 | 17 | −65 | 1 | 1 |
| 24 | −60 | 1 | 1 | 20 | −70 | 1 | 1 |

While only two signal propagation profiles are shown in the table, optionally, a single signal propagation profile or more than two signal propagation profiles may be used. In the above table, the wireless message characteristics measured or determined for the different consist configurations are listed, as well as the locations where the wireless message characteristics are measured or determined. The "Locations" represent different distances or locations along the route 110 (e.g., expressed in terms of miles, kilometers, or the like), the "RSS" represent received signal strengths (e.g., in decibels) of wireless messages received at or near (e.g., within a designated distance, such as 10 meters, 100 meters, or the like) the corresponding location, the "Rx" indicate whether the wireless message(s) were received at or near the corresponding location (e.g., with 1 indicating successful receipt of the message and 0 indicating that no message was received at the location, even though a message was sent and expected to be received at that location), and the "Q" indicate whether the received message was corrupted (e.g., with 1 indicating that the data in the message was not corrupted and 0 indicating that the data was corrupted or that no message was received).

The consist configurations in the signal propagation profile can represent different sizes of vehicle systems 102. Additionally or alternatively, the consist configurations can represent different distances between pairs of a lead vehicle and a remote vehicle. In such a situation, a single vehicle system 102 may have several consist configurations, with two or more of the signal propagation profiles associated with different pairs of the lead vehicle and different remote vehicles. The signal propagation profiles can be examined to identify potential segments of the route 110 where a vehicle system 102 having the same consist configuration may experience problems with wireless communications.

As one example, the signal propagation profile for a route can be used by one or more control units (described below) of the vehicle system 102 to identify upcoming locations along the route where communication problems are expected to occur. During movement of the vehicle system 102 along the route 110, the control unit of the lead vehicle 104 can determine a current location of the vehicle system 102 (e.g., based on data generated or obtained by the location determining unit described below) and examine the signal propagation profile to determine if one or more upcoming locations along the route 110 are likely to have poor communications. With respect to the signal propagation profile represented in the table shown above, a vehicle system 102 that is approaching the seventy mile or kilometer location along the route 110 can examine the signal propagation profile.

If the vehicle consist 102 has consist configuration information that is the same or similar to the Consist Configuration A, then the control unit of the vehicle consist 102 can examine the wireless message characteristics at the locations associated with the eighth and/or thirteenth mile or kilometer locations in the signal propagation profile. As shown above, the wireless message characteristics in the signal propagation profile shown above for the Consist Configuration A indicate that wireless messages may not be received at or near the eighth mile or kilometer location along the route 110 and/or that wireless messages may have low strengths at or near the thirteenth mile or kilometer along the route 110. With respect to received signal strengths, the control unit can compare the received signal strengths to one or more thresholds (e.g., −80 dBm, −100 dBm, −115 dBm, or the like) and determine whether the received signal strengths are lower or greater than the threshold. If the received signal strengths indicate weaker received signal strengths than the threshold, then the control unit may determine that communication problems are expected at or near the corresponding locations.

On the other hand, if the vehicle system 102 has consist configuration information that is the same or similar to the Consist Configuration B, then the control unit can determine that the received signal strengths at or near the fifth and thirteenth mile or kilometers distances indicate potential communication problems with weak messages, that the missed messages at or near the eighth and ninth mile or kilometer distances indicate that messages may be missed at or near those locations, and/or that the messages may be corrupted at or near the fourth mile or kilometer distance.

The control unit can then use one or more output devices (described below) onboard the vehicle system 102 to warn the operator of the upcoming locations and the potential inability for the vehicles 104, 106 or for a group of the vehicles 104, 106 to communicate in these locations. The operator may then adjust how the vehicle system 102 is controlled through these locations. For example, the control unit may direct the operator to not remotely change throttle positions of the remote vehicles 106 or otherwise control the vehicle system 102 in such a manner that would involve wireless communication between the vehicles 104, 106 in these locations.

As another example, an energy management system (described below) can refer to the signal propagation profile to create a trip plan for the vehicle system 102 to travel over all or at least a portion of the route 110 in an upcoming or current trip. The trip plan dictates or designates operational settings of the vehicle system 102 as a function of distance and/or time along the route 110. For example, the trip plan can represent different throttle settings or notch positions, brake settings, speeds, or the like, of the vehicle system 102 and/or for individual vehicles 104, 106 at different locations along the route 110 and/or different times during movement along the route 110. The trip plan may be created to dictate the operational settings of the vehicle system 102 for portions of the route 110 before the vehicle system 102 travels over those portions of the route 110.

The energy management system can generate the trip plan by examining the signal propagation profile. For example, the energy management system can determine the consist configuration information of the vehicle system 102 for which the trip plan is being generated and examine the signal propagation profile to determine if any segments of the route 110 are associated with locations having wireless message characteristics that indicate potential communication problems. The trip plan can then be created so that the operational settings do not change during travel of the vehicle system 102 in these segments. Optionally, scheduled commands may be communicated to the remote vehicles based on the trip plan and the segments so that the remote vehicles are aware of the operational settings designated by the trip plan in these segments before reaching the segments and/or reaching designated times of the trip plan, as described above. In the signal propagation profiles shown in the table above, the energy management system may create a trip plan for a vehicle system 102 having the same or similar consist configuration information as the Consist Configuration A so that the vehicle system 102 does not change operational settings (e.g., throttle notch positions, brake settings, speeds, or the like) during travel through the eighth and/or thirteenth mile or kilometer location. With respect to the Consist Configuration B, the energy management system can create the trip plan so that operational settings are not changed during travel through the fourth, fifth, eighth, ninth, and/or thirteenth mile or kilometer locations along the route 110.

Optionally, if the consist configuration information in the signal propagation profiles represent different distances between pairs of lead and remote vehicles, then the trip plan can be formed so that the operational settings of the remote vehicles represented by the consist configuration information of the signal propagation profile do not change at or near the locations associated with low received signal strengths, missed messages, and/or corrupted messages.

As another example, prior to forming the vehicle system, the signal propagation profile may be examined for a route to determine if one or more different configurations of the vehicle system 102 are likely to result in better communications during travel over the route than one or more other configurations. For example, in a vehicle yard (e.g., a rail yard) where different vehicles 104, 106, 108 are considered for being combined into a vehicle system 102, an analysis system (described below) can examine the signal propagation profile for the route 110 to determine which vehicles 104, 106, 108 should be included in the vehicle system 102. In the signal propagation profile shown above, vehicle systems having the consist configuration information that matches the Consist Configuration B appear to have poorer communications in more frequent locations along the route 110 when compared to the Consist Configuration A. Therefore, the analysis system may recommend forming the vehicle system 102 according to the same consist configuration information as is represented by the Consist Configuration A. This recommendation may be presented to one or more personnel responsible for forming the vehicle system 102 using one or more output devices (described below) of the analysis system.

The signal propagation profile optionally may be used to determine if one or more communication units of the vehicle system 102 are not working or may be otherwise degraded. During travel over the route 110, wireless message characteristics may be monitored at various locations along the route 110 by the communication units of the moving vehicle system 102. These monitored signal strengths can be compared to the wireless message characteristics in the signal propagation profiles at the same or nearby locations (e.g., within a designated distance of ten meters, twenty meters or the like) for the same or similar consist configuration information as the vehicle system 102 that is currently traveling along the route 110. If the currently monitored signal strengths are lower than the wireless message characteristics in the signal propagation profile at the same or similar location, then one or more communication units and/or control units of the vehicle system 102 may determine that one or more of the communication units are not working properly. For example, if no signal is received in or near a location where the signal propagation profile indicates that a relatively strong signal should be received (e.g., the signal propagation profile includes a wireless message characteristic greater than the designated threshold at or near that location), then a fault with one or more communication units may be identified. As another example, if the wireless message characteristic is significantly less (e.g., by at least a designated threshold, such as —20 dB, –10 dB, or another value) than the wireless message characteristic in the signal propagation profile at or near the same location, then a fault with one or more communication units may be identified. In response to identifying such a fault, the control unit and/or communication unit of one or more of the vehicles 104, 106 may generate a warning that is conveyed to the operator of the vehicle system 102 via one or more of the output devices.

Figure 5:
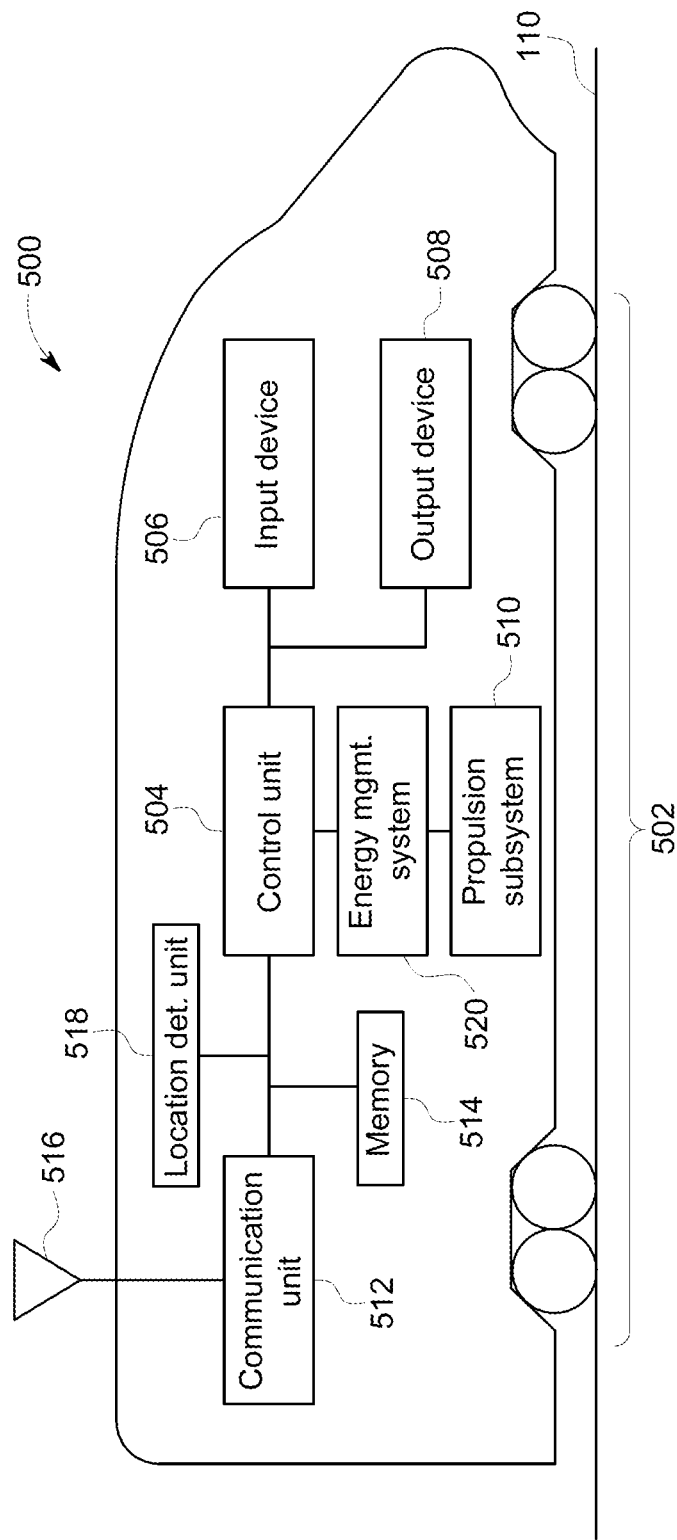
FIG. 5 is a schematic diagram of a propulsion-generating vehicle in accordance with one embodiment.

FIG. 5 is a schematic diagram of a propulsion-generating vehicle 500 in accordance with one embodiment. The vehicle 500 may represent one or more of the vehicles 104, 106 shown in FIG. 1. The vehicle 500 includes a communication system 502 that includes a control unit 504 that controls operations of the vehicle 500. The control unit 504 can include or represent one or more hardware circuits or circuitry that include, are connected with, or that both include and are connected with one or more processors, controllers, or other hardware logic-based devices. As described above, the control unit 504 can perform a variety of operations of the vehicle 500, such as automatically controlling operations of the vehicle 500 based on the operational settings designated by a trip plan, determining when the vehicle system 102 is approaching a segment of the route 110 that is associated with low wireless message characteristics based on the consist configuration information of the vehicle system 102, generating a warning signal to warn the operator of the vehicle 500 or vehicle system 102 in response thereto, and the like.

The control unit 504 is connected with an input device 506 and an output device 508. The control unit 506 can receive manual input from an operator of the vehicle 500 through the input device 506. The input device 506 represents one or more touchscreens, keyboards, microphones, styluses, or the like. The control unit 504 can present information to the operator using the output device 508, which can represent a display screen (e.g., touchscreen or other screen), speakers, printer, or the like. This output can include a warning of an upcoming segment of the route 110 where communication problems are expected or predicted to occur based on the signal propagation profile of the route 110, the consist configuration information of the vehicle system 102 that includes the control unit 504, and the upcoming locations of the route 110. The output optionally may include a display of measured signal strengths that are being measured by the vehicle 500, displays of operational settings designated by a trip plan (so that the operator can manually control the vehicle 500 based on the operational settings), display of one or more portions of the signal propagation profile of the route 110 (e.g., maps, tables, lists, or the like, of the wireless message characteristics and associated locations, etc.), or other information.

The control unit 504 is operably connected with a propulsion subsystem 510 of the powered vehicle 500, such as by being connected with the propulsion system 510 by one or more wired and/or wireless connections. The propulsion subsystem 510 provides tractive effort and/or braking effort of the vehicle 500. The propulsion subsystem 510 may include or represent one or more engines, motors, alternators, generators, brakes, batteries, turbines, and the like, that operate to propel the vehicle 500 under the manual or autonomous control that is implemented by the control unit 504. For example, the control unit 504 can generate control signals autonomously or based on manual input and/or operational settings designated by a trip plan that are used to direct operations of the propulsion subsystem 510.

The control unit 504 also is operably connected with a communication unit 512 and a memory 514 described herein. The memory 514 can represent an onboard device that electronically and/or magnetically stores data. For example, the memory 514 may represent a computer hard drive, random access memory, read-only memory, dynamic random access memory, an optical drive, or the like. The memory 514 may store, log, or otherwise record the wireless message characteristics that are measured or otherwise obtained by the communication unit 512 during movement of the vehicle 500. These wireless message characteristics may be communicated to the analysis system described below for use in creating and/or updating a signal propagation profile for the route 110. The memory 514 optionally may store part or all of the signal propagation profile for the route 110, so that the control unit 504 and/or energy management system (described below) of the vehicle 500 can refer to the signal propagation profile during travel of the vehicle 500, as described above.

The communication unit 512 includes or represents hardware and/or software that is used to communicate with other vehicles 500 in the vehicle system 102, such as one or more other vehicles 104, 106. For example, the communication unit 512 may include a transceiver or antenna 516 and associated circuitry for wirelessly communicating (e.g., communicating and/or receiving) signals. The communication unit 512 optionally may communicate with the analysis system described below, such as to send wireless message characteristics measured by the communication unit 512, to receive a signal propagation profile for the route 110, or the like. The communication unit 512 can measure the strengths of the signals received by the vehicle 500, as described above.

The location determining unit 518 of the vehicle 500 includes hardware and/or software that identifies locations of the vehicle 500 and/or vehicle system 102 as the vehicle 500 moves along the route 110, as described above. In one embodiment, the location determining unit 518 includes a global positioning system receiver that generates data representative of locations of the vehicle 500. This data may be communicated or otherwise accessible to the control unit 504 and/or the communication unit 512, so that the locations of the vehicle 500 can be monitored to associate locations with wireless message characteristics measured by the communication unit 512, to identify potential communication problems for upcoming segments of the route 110, or the like. Optionally, the location determining unit 518 can include one or more processors, controllers, or the like, that calculate the locations of the vehicle 500 based on other data, such as speeds at which wheels of the vehicle 500 rotate, airspeed of ambient air outside of the vehicle 500, elapsed time and speed of the vehicle 500 since a known location, or the like.

The energy management system 520 of the vehicle 500 represents hardware and/or software, such as one or more processors, controllers, or the like, that create and/or modify trip plans for the vehicle 500 and/or vehicle system 102. The energy management system 520 can create the trip plans so as to avoid requiring the communication of wireless command signals to one or more other vehicles 106 from the vehicle 500 in locations that are likely to have communication problems based on the signal propagation profile of the route 110, as described above. The energy management system 520 alternatively may be disposed off-board the vehicle 500.

Figure 6:
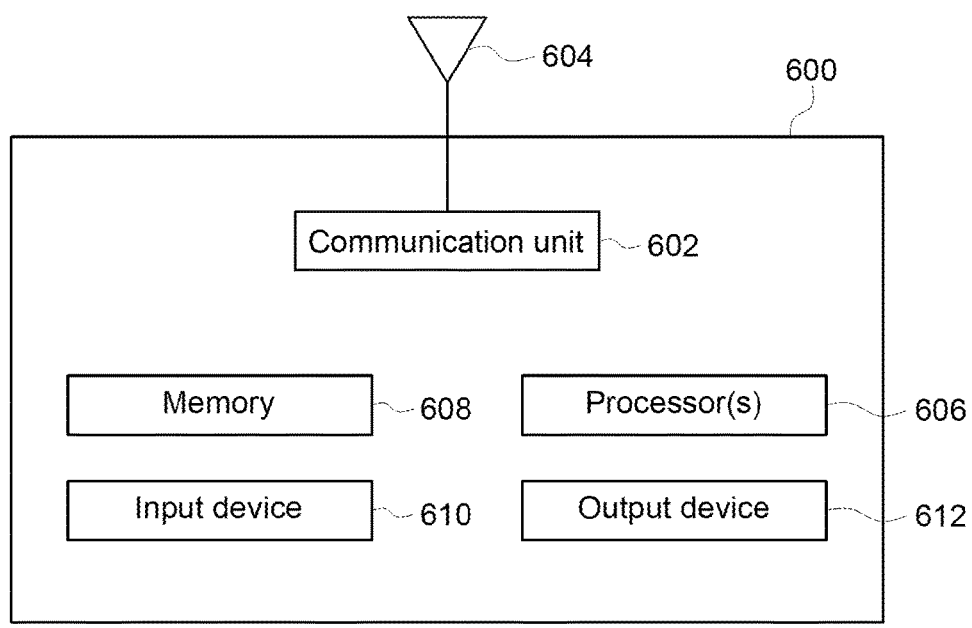
FIG. 6 illustrates a schematic diagram of an analysis system according to one embodiment.

FIG. 6 illustrates a schematic diagram of an analysis system 600 according to one embodiment. As described above, the analysis system 600 examines wireless message characteristics measured by one or more vehicle systems 102 during travel along the route 110, locations of the vehicles 104, 106 associated with the wireless message characteristics, and consist configuration information of the vehicle systems 102. Based on this information, the analysis system 600 can determine a signal propagation profile for the route 110. For example, the analysis system 600 can separate the wireless message characteristics and associated locations from multiple different vehicle systems 102 into different groups based on the consist configuration information of the vehicle systems 102. The analysis system 600 can then match the locations and the associated wireless message characteristics with each other within the different groups to generate the signal propagation profile.

The analysis system 600 is shown as being disposed off-board the vehicle system 102. Alternatively, some or all of the analysis system 600 is disposed onboard the vehicle system 102. The analysis system 600 includes a communication unit 602 that communicates with vehicle systems 102 via one or more wired and/or wireless connections. The communication unit 602 may include a transceiver and/or antenna 604, and associated circuitry, for communicating with the vehicle systems 102 to receive measured signal strengths, locations, consist configuration information, and the like. The communication unit 602 may communicate signal propagation profiles to the vehicle systems 102, recommendations for how to build vehicle systems 102 to personnel at vehicle yards that are forming the vehicle systems 102 based on the signal propagation profiles, or the like.

The analysis system 600 includes one or more processors 606 that examine the wireless message characteristics, associated locations, and consist configuration information from different vehicle systems 102 to form the signal propagation profiles for one or more routes 110, as described herein. The processors 606 optionally may generate recommendations for how to form vehicle systems 102 so that the vehicle systems 102 have the consist configuration information for the route 110 to reduce or eliminate the likelihood of communication problems based on the signal propagation profile for the route 110.

A memory 608 of the analysis system 600 may be similar or identical to the memory 514 of the vehicle 500 shown in FIG. 5. The memory 608 can store the wireless message characteristics, associated locations, consist configuration information, signal propagation profiles, and the like, described above. The analysis system 600 also includes an input device 610 and an output device 612. The input device 610 represents one or more touchscreens, keyboards, microphones, styluses, or the like. The input device 610 can be used by an operator to input information such as consist configuration information, wireless message characteristics, locations, or the like, into the memory 608. The output device 612 can represent a display screen (e.g., touchscreen or other screen), speakers, printer, or the like, that generates output for one or more operators. This output can include signal propagation profiles, recommendations for forming vehicle systems 102, or the like.

In one embodiment, a method (e.g., for correlating wireless communication performance with vehicle system configurations) includes determining wireless message characteristics of wireless messages communicated with first vehicles in one or more first vehicle systems and locations along a route where the wireless message characteristics were determined. The wireless message characteristics and the locations can be determined during movement of the one or more first vehicle systems along a route. The method also can include obtaining consist configuration information about the one or more first vehicle systems, and determining a signal propagation profile based on the wireless message characteristics, the locations where the wireless message characteristics were determined, and the consist configuration information. The signal propagation profile can represent one or more relationships between the wireless message characteristics, the consist configuration information, and the locations along the route.

In one aspect, the wireless message characteristics can include one or more of received signal strengths of the wireless messages, receipt of messages communicated at known times, missed wireless messages of the wireless messages, or corrupted wireless messages of the wireless messages.

In one aspect, the wireless messages can include distributed power messages wirelessly communicated between the first vehicles in the one or more first vehicle systems during remote control of one or more remote vehicles of the first vehicles by one or more lead vehicles of the first vehicles.

In one aspect, the consist configuration information can include one or more of a size of the one or more vehicle systems or relative positions of the vehicles in the one or more first vehicle systems during the movement of the one or more first vehicle systems along the route.

In one aspect, the signal propagation profile can include a spatial relationship between the wireless message characteristics of the wireless messages and the locations along the route.

In one aspect, the method also can include creating a trip plan for an upcoming trip of a second vehicle system based on the signal propagation profile. The trip plan can designate operational settings of the second vehicle system at one or more different times or distances along the route and that are to be wirelessly communicated from a lead vehicle of the second vehicle system to one or more remote vehicles of the second vehicle system for wireless control of the one or more remote vehicles according to the trip plan. The trip plan can be created based on the signal propagation profile such that the operational settings that are designated in the trip plan for the one or more remote vehicles do not change during movement of the second vehicle system through one or more segments of the route based on the signal propagation profile.

In one aspect, the method also can include creating a trip plan for an upcoming trip of a second vehicle system based on the signal propagation profile. The trip plan can designate operational settings of the second vehicle system at one or more different times or distances along the route and that are to be wirelessly communicated from a lead vehicle of the second vehicle system to one or more remote vehicles of the second vehicle system for wireless control of the one or more remote vehicles according to the trip plan. The method also can include identifying one or more upcoming segments of the route associated with an inability to wirelessly communicate between the lead vehicle and the one or more remote vehicles based on the wireless message characteristics associated with the one or more upcoming segments of the route, and wirelessly communicating scheduled commands from the lead vehicle to the one or more remote vehicles prior to the one or more remote vehicles reaching the one or more upcoming segments. The scheduled commands can include the operational settings designated by the trip plan for one or more locations within the one or more upcoming segments of the route.

In one aspect, the method also can include identifying one or more second vehicles to be included in a second vehicle system for travel along the route during an upcoming trip of the second vehicle system based on the signal propagation profile.

In one aspect, the method also can include generating one or more warnings to an operator of a second vehicle system moving along the route of one or more upcoming segments of the route where wireless communications between a lead vehicle and one or more remote vehicles of the second vehicle system are degraded based on the signal propagation profile.

In one aspect, the method also can include monitoring additional wireless message characteristics of additional wireless messages communicated between a lead vehicle and one or more remote vehicles in a second vehicle system during movement of the second vehicle system along the route, and generating a warning indicative of a fault in a communication system of the second vehicle system based on a comparison between the additional wireless message characteristics for the second vehicle system and the signal propagation profile.

In another embodiment, a system (e.g., an analysis system) can includes one or more processors configured to determine wireless message characteristics of wireless messages communicated with first vehicles in one or more first vehicle systems and locations along a route where the wireless message characteristics were determined. The wireless message characteristics and the locations can be determined during movement of the one or more first vehicle systems along a route. The one or more processors also can be configured to obtain consist configuration information about the one or more first vehicle systems, and to determine a signal propagation profile based on the wireless message characteristics, the locations where the wireless message characteristics were determined, and the consist configuration information. The signal propagation profile can represent one or more relationships between the wireless message characteristics, the consist configuration information, and the locations along the route. The one or more processors can include a single processor that performs all of these operations, two or more processors that each perform all of these operations, two or more processors that perform different ones of the above operations, and/or two or more processors that each perform part of one or more of the above operations.

In one aspect, the wireless message characteristics can include one or more of received signal strengths of the wireless messages, receipt of messages communicated at known times, missed wireless messages of the wireless messages, or corrupted wireless messages of the wireless messages.

In one aspect, the wireless messages can include distributed power messages that were wirelessly communicated between the first vehicles in the one or more first vehicle systems during remote control of one or more remote vehicles of the first vehicles by one or more lead vehicles of the first vehicles.

In one aspect, the consist configuration information can include one or more of a size of the one or more vehicle systems or relative positions of the vehicles in the one or more first vehicle systems during the movement of the one or more first vehicle systems along the route.

In one aspect, the one or more processors can be configured to identify one or more second vehicles to be included in a second vehicle system for travel along the route during an upcoming trip of the second vehicle system based on the signal propagation profile.

In another embodiment, a system (e.g., a communication system of a vehicle system) includes a control unit configured to be disposed onboard a first vehicle system having plural vehicles for traveling together along a route. The control unit can be configured to obtain a signal propagation profile for the route that is representative of wireless message characteristics for one or more second vehicle systems, consist configuration information of the one or more second vehicle systems, and locations along the route where the wireless message characteristics were measured during previous travel of the one or more second vehicle systems along the route. The control unit can be configured to compare consist configuration information of the first vehicle system with the consist configuration information of the one or more second vehicle systems in the signal propagation profile to determine a spatial relationship between the wireless message characteristics of the one or more second vehicle systems and the locations along the route.

In one aspect, the consist configuration information of the first vehicle system can include one or more of a size of the first vehicle system or relative positions of the vehicles in the first vehicle system.

In one aspect, the system also can include an energy management system configured to create a trip plan for a trip of the first vehicle system along the route based on the signal propagation profile. The trip plan can designate operational settings of the first vehicle system at one or more different times or distances along the route and that are to be wirelessly communicated between the vehicles of the first vehicle system for wireless control of one or more of the vehicles according to the trip plan.

In one aspect, the energy management system can be configured to create the trip plan based on the signal propagation profile such that the operational settings that are designated in the trip plan for the one or more vehicles in the first vehicle system do not change during movement of the first vehicle system through one or more segments of the route based on the spatial relationship between the wireless message characteristics of the one or more second vehicle systems and the locations along the route.

In one aspect, the control unit can be configured to identify one or more upcoming segments of the route associated with an inability to wirelessly communicate with one or more of the vehicles in the first vehicle system based on the wireless message characteristics associated with the one or more upcoming segments of the route from the spatial relationship between the wireless message characteristics of the one or more second vehicle systems and the locations along the route. The control unit also can be configured to communicate scheduled commands to the one or more vehicles prior to the one or more vehicles reaching the one or more upcoming segments, the scheduled commands including the operational settings designated by the trip plan for one or more locations within the one or more upcoming segments of the route.

In one aspect, the control unit can be configured to generate one or more warnings to an operator of the first vehicle system moving along the route of one or more upcoming segments of the route where wireless communications between the vehicles of the first vehicle system are predicted to be degraded based on the spatial relationship between the wireless message characteristics of the one or more second vehicle systems and the locations along the route.

In one aspect, the control unit can be configured to monitor additional wireless message characteristics of additional wireless communications between the vehicles during movement of the first vehicle system along the route and to generate a warning indicative of a fault in a communication system of the first vehicle system based on a comparison between the additional wireless message characteristics for the first vehicle system and the spatial relationship between the wireless message characteristics of the one or more second vehicle systems and the locations along the route.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. § 112(f), unless and until such clause limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the clauses, and may include other examples that occur to one of ordinary skill in the art. Such other examples are intended to be within the scope of the clauses if they have structural elements that do not differ from the literal language of the clauses, or if they include equivalent structural elements with insubstantial differences from the literal languages of the clauses.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be standalone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A method comprising:
    determining wireless message characteristics of wireless messages communicated with first vehicles in one or more first vehicle systems and locations along a route where the wireless message characteristics were determined, the wireless message characteristics and the locations determined during movement of the one or more first vehicle systems along the route;
    obtaining a size of the one or more first vehicle systems;
    determining a signal propagation profile based on the wireless message characteristics, the locations where the wireless message characteristics were determined, and the size of the one or more first vehicle system, the signal propagation profile representative of a relationships between the wireless message characteristics, the size of the one or more first vehicle systems, and the locations along the route,
    obtaining relative positions of the vehicles in the one or more first vehicle systems during the movement of the one or more first vehicle systems along the route, wherein the relationship of the signal progagation profile also is between the wireless message characteristics, the size of the one or more first vehicle systems, the locations along the route, and the relative positions of the vehicles.

2. The method of claim 1, wherein the wireless message characteristics include one or more of received signal strengths of the wireless messages, receipt of messages communicated at known times, missed wireless messages of the wireless messages, or corrupted wireless messages of the wireless messages.

3. The method of claim 1, wherein the wireless messages include distributed power messages wirelessly communicated between the first vehicles in the one or more first vehicle systems during remote control of one or more remote vehicles of the first vehicles by one or more lead vehicles of the first vehicles.

4. The method of claim 1, wherein the signal propagation profile includes a spatial relationship between the wireless message characteristics of the wireless messages and the locations along the route.

5. The method of claim 1, further comprising creating a trip plan for an upcoming trip of a second vehicle system based on the signal propagation profile, the trip plan designating operational settings of the second vehicle system at different times or locations along the route and that are to be wirelessly communicated from a lead vehicle of the second vehicle system to one or more remote vehicles of the second vehicle system for wireless control of the one or more remote vehicles according to the trip plan,
    wherein the trip plan is created based on the signal propagation profile such that the operational settings that are designated in the trip plan for the one or more remote vehicles do not change during movement of the second vehicle system through one or more segments of the route based on the signal propagation profile.

6. The method of claim 1, further comprising:
    creating a trip plan for an upcoming trip of a second vehicle system based on the signal propagation profile, the trip plan designating operational settings of the second vehicle system at one or more different times or locations along the route and that are to be wirelessly communicated from a lead vehicle of the second vehicle system to one or more remote vehicles of the second vehicle system for wireless control of the one or more remote vehicles according to the trip plan;
    identifying one or more upcoming segments of the route associated with an inability to wirelessly communicate between the lead vehicle and the one or more remote vehicles based on the wireless message characteristics associated with the one or more upcoming segments of the route; and
    wirelessly communicating scheduled commands from the lead vehicle to the one or more remote vehicles prior to the one or more remote vehicles reaching the one or more upcoming segments, the scheduled commands including the operational settings designated by the trip plan for one or more locations within the one or more upcoming segments of the route.

7. The method of claim 1, further comprising identifying one or more second vehicles to be included in a second vehicle system for travel along the route during an upcoming trip of the second vehicle system based on the signal propagation profile.

8. The method of claim 1, further comprising generating one or more warnings to an operator of a second vehicle system moving along the route of one or more upcoming segments of the route where wireless communications between a lead vehicle and one or more remote vehicles of the second vehicle system are degraded based on the signal propagation profile.

9. The method of claim 1, further comprising:
    monitoring additional wireless message characteristics of additional wireless messages communicated between a lead vehicle and one or more remote vehicles in a second vehicle system during movement of the second vehicle system along the route; and generating a warning indicative of a fault in a communication system of the second vehicle system based on a comparison between the additional wireless message characteristics for the second vehicle system and the signal propagation profile.

10. The method of claim 1, wherein the first vehicles are one or more automobiles or marine vessels.

11. The system comprising:

one or more processors configured to determine wireless message characteristics of wireless messages communicated with first vehicles in one or more first vehicle systems an locations along a route where the wireless message characteristics were determined, the wireless message characteristics and the locations determined during movement of the one or more first vehicle systems along a route, the one or more processors also are configured to obtain a size of the one or more first vehicle systems, and to determine a signal propagation profile based on the wireless message characteristics, the locations where the wireless message characteristics were determined, and the size of the one or more first vehicle systems, wherein the signal propagation profile represents one or more relationships between the wireless message characteristics, the size of the one or more first vehicle systems, and the locations along the route;

wherein the one or more processors also are configured to determine the relationship representative of the signal propagation profile between the wireless message characteristics, the locations where the wireless message characteristics were determined, the size of the one or more first vehicle systems, and relative positions of the vehicles in the one or more first vehicle systems during the movement of the one or more first vehicle systems along the route.

12. The system of claim 11, wherein the wireless message characteristics include one or more of received signal strengths of the wireless messages, receipt of message communicated at known times, missed wireless messages of the wireless messages, or corrupted wireless messages of the wireless messages.

13. The system of claim 11, wherein the wireless messages include distributed power messages that were wirelessly communicated between the first vehicles in the one or more first vehicle systems during remote control of one or more remote vehicles of the first vehicles by one or more lead vehicles of the first vehicles.

14. The system of claim 11, wherein the one or more processors are configured to identify one or more second vehicles to be included in a second vehicle system for travel along the route during an upcoming trip of the second vehicle system based on the signal propagation profile.

15. The system of claim 11, wherein the first vehicles are one or more automobiles or marine vessels.

16. A system comprising:

a control unit configured to be disposed onboard a first vehicle system having plural vehicles for traveling together along a route, the control unit configured to obtain a signal propagation profile for the route that is representative of wireless message characteristics for one or more second vehicle systems, consist configuration information of the one or more second vehicle systems, and locations along the route where the wireless message characteristics were measured during previous travel of the one or more second vehicle systems along the route, wherein the control unit is configured to compare consist configuration information of the first vehicle system with the consist configuration information of the one or more second vehicle systems in the signal propagation profile to determine a spatial relationship between the wireless message characteristics of the one or more second vehicle systems and the locations along the route.

17. The system of claim 16, wherein the consist configuration information of the first vehicle system includes a size of the first vehicle system.

18. The system of claim 16, further comprising an energy management system configured to create a trip plan for a trip of the first vehicle system along the route based on the signal propagation profile, the trip plan designating operational settings of the first vehicle system at one or more different times or locations along the route and that are to be wirelessly communicated between the vehicles of the first vehicle system for wireless control of one or more of the vehicles according to the trip plan.

19. The system of claim 18, wherein the energy management system is configured to create the trip plan based on the signal propagation profile such that the operational settings that are designated in the trip plan for the one or more vehicles in the first vehicle system do not change during movement of the first vehicle system through one or more segments of the route based on the spatial relationship between the wireless message characteristics of the one or more second vehicle systems and the locations along the route.

20. The system of claim 18, wherein the control unit is configured to identify one or more upcoming segments of the route associated with an inability to wirelessly communicate with one or more of the vehicles in the first vehicle system based on the wireless message characteristics associated with the one or more upcoming segments of the route from the spatial relationship between the wireless message characteristics of the one or more second vehicle systems and the locations along the route, the control unit also configured to communicate scheduled commands to the one or more vehicles prior to the one or more vehicles reaching the one or more upcoming segments, the scheduled commands including the operational settings designated by the trip plan for one or more locations within the one or more upcoming segments of the route.

21. The system of claim 18, wherein the control unit is configured to generate one or more warnings to an operator of the first vehicle system moving along the route of one or more upcoming segments of the route where wireless communications between the vehicles of the first vehicle system are predicted to be degraded based on the spatial relationship between the wireless message characteristics of the one or more second vehicle systems and the locations along the route.

22. The system of claim 18, wherein the control unit is configured to monitor additional wireless message characteristics of additional wireless communications between the vehicles during movement of the first vehicle system along the route and to generate a warning indicative of a fault in a communication system of the first vehicle system based on a comparison between the additional wireless message characteristics for the first vehicle system and the spatial relationship between the wireless message characteristics of the one or more second vehicle systems and the locations along the route.

23. The system of claim 16, wherein the vehicles are one or more automobiles or marine vessels.

\* \* \* \* \*